Oct. 20, 1964     S. MYLIE     3,153,774
CONTROL DEVICE FOR STREET FLASHER LIGHT
Filed April 1, 1963
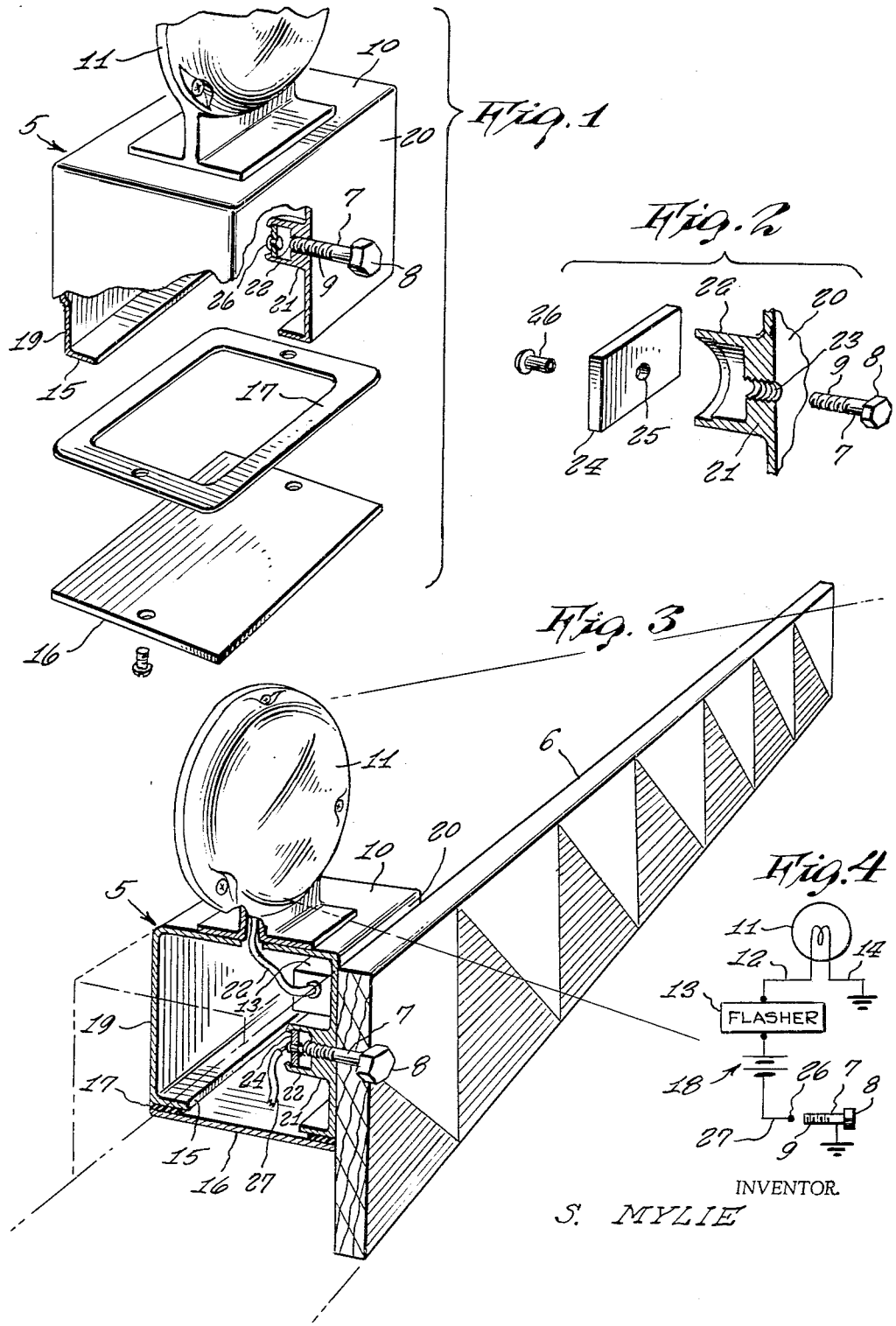
INVENTOR.
S. MYLIE 3,153,774
CONTROL DEVICE FOR STREET FLASHER LIGHT
Salvatore Mylie, 124 Grotto St., Eureka, Calif.
Filed Apr. 1, 1963, Ser. No. 269,366
1 Claim. (Cl. 340—119)

This invention relates to street safety flasher lights, and particularly to effective means of simple character for controlling and operating such flasher lights.

The main object of my invention is to provide a flasher light control device of simple construction which serves for battery operation of the lights.

An ancillary object of my invention is to provide a flasher control device with a safe and effective cut off which eliminates difficulties of operation and loss of time.

Another object of this invention is to have such a flasher control device so constructed that opening and closing the housing associated therewith for plugging in and unplugging a battery forming the flasher source will avoid all damage to the flasher wiring, and will prevent the device from being stored away actively flashing.

A further object of the invention includes means for turning the flasher on and off in a simple manner which is more or less concealed from children and pranksters and thus safe from tampering.

It is thus an object of this invention to have a disguised switch in the form of a bolt for securing the flasher housing to a barricade, for example, and capable of making contact with a ground lead in the housing so as to turn on the flasher when rotated partly clockwise, while a slight turn of this bolt counterclockwise turns off the flasher.

It is, of course a practical object of my invention to have the control device so designed and arranged as to save battery power and lengthen the useful life of the flasher batteries.

Other objects and advantages of my invention will appear in greater detail as the specification proceeds.

In order to facilitate clear comprehension of this invention for proper appreciation of the salient features thereof, the invention is illustrated on the accompanying drawing forming part hereof, and in which:

FIGURE 1 is an exploded view of a flasher made according to my invention and embodying the same in a practical form, parts being broken away to further disclose details of construction;

FIGURE 2 is an enlarged exploded view of detail, partly in section, also further revealing details of construction;

FIGURE 3 is a perspective view of a barricade with a flasher control device embodying the invention secured thereto in operative position; while FIGURE 4 is a circuit diagram for the invention.

Throughout the views, the same reference numerals indicate the same parts and features.

When barricades are set up to close off parts of streets and roads, they are usually provided with flashers to attract attention of motorists. However, flashers get out of order, are tampered with by children, and their batteries suffer from dampness and run down all too soon. The invention is designed to overcome all such difficulties.

Hence, in the practice of my invention, and referring now again to the drawing, a flasher control unit housing, generally indicated at 5 is adapted to be mounted on a barricade 6 and secured in place by a bolt 7 having a head 8 and a threaded end 9. Upon the top 10 of the housing is mounted a flasher light 11 connected by a lead 12 to a flasher unit 13 within the housing, the other lead or pole 14 of the light being grounded to the housing as indicated in FIGURE 4. The open bottom 15 of housing 5 is closed by a bottom plate 16 with an insulating gasket 17 inserted between to make the housing a water proof container for the flasher battery (not shown except at 18 in FIGURE 4).

While the outer side wall 19 of the housing is a blank wall, the inner opposite wall 20 adjacent to the barricade has an integral switch body 21 projecting into the housing and having a hollow inner end 22 and a horizontal tapped hole 23 extending inwardly through the switch body for receiving the threaded end 9 of bolt 7. To the hollow end 22 is fixed an insulating disk or pad 24 having a hole 25 provided with an upset rivet 26 extending through this hole in alinement with bolt 7, so that a partial clockwise turn of the bolt brings it into contact with the rivet. If the lead 27 from the battery is connected to the rivet outside pad 24, such a turn of the bolt closes the flasher and sets the latter going. Upon turning the bolt just a partial turn counterclockwise, this bolt is withdrawn from contact with the rivet and opens the circuit and stops the flasher. Thus the bolt serves as an on and off switch in disguise, while also serving to secure the flasher control housing and the entire flasher assembly to the barricade in a simple yet secure manner.

Manifestly, variations may be resorted to, and parts may be modified or used without others within the scope of the appended claim.

Having now fully described my invention, I claim:

A street flasher device including a battery housing having end walls, a top connected thereto, a pair of spaced apart side walls connected to the top and the end walls, an open bottom permitting insertion and plug-in of a flasher battery, a flasher light mounted on the housing connected into an operating circuit with the battery, a flasher switch connected into the circuit to produce intermittent current flow in said circuit when energised, means including a closure plate and gasket removably secured to the bottom of said housing for closing the same, and means included in said operating circuit for opening and closing the same at will comprising an internally tapped portion formed integrally with the housing, a threaded bolt member rotatable in the tapped portion, and an insulated stationary contact member supported in said housing in line with said bolt member to permit the latter to be rotated into and out of engagement with said stationary contact to thereby make and break the circuit, said internally tapped portion being grounded to complete the circuit and said threaded bolt member being adapted to be inserted through a hole in a barricade or the like prior to insertion into the internally tapped portion for the purpose of securing the flasher device to said barricade.

References Cited in the file of this patent
UNITED STATES PATENTS

| | | |
|---|---|---|
| 1,877,940 | Morgenstern et al. | Sept. 20, 1932 |
| 2,260,459 | Kilar | Oct. 28, 1941 |
| 2,813,265 | Finks | Nov. 12, 1957 |